(12) United States Patent
Hager et al.

(10) Patent No.: US 6,750,807 B1
(45) Date of Patent: Jun. 15, 2004

(54) RADAR ALTIMETER WITH FORWARD OBSTACLE AVOIDANCE CAPABILITIES

(75) Inventors: James R. Hager, Golden Valley, MN (US); Larry D. Almsted, Bloomington, MN (US); Larry D. Yaeger, Medina, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/459,142

(22) Filed: Jun. 11, 2003

(51) Int. Cl.$^7$ .............................................. G01S 13/08
(52) U.S. Cl. ....................... 342/120; 342/121; 342/122
(58) Field of Search ................................ 342/120, 121, 342/122, 123, 175, 27, 82, 83, 84, 85, 89, 90, 98, 99

(56) References Cited

U.S. PATENT DOCUMENTS

| | | | |
|---|---|---|---|
| 4,595,925 A | * | 6/1986 | Hansen ........................ 342/123 |
| 4,945,360 A | * | 7/1990 | Trummer et al. ........... 342/122 |
| 5,047,779 A | | 9/1991 | Hager |
| 5,736,957 A | * | 4/1998 | Raney .......................... 342/99 |
| 5,742,635 A | | 4/1998 | Sanderford, Jr. |
| 5,764,686 A | | 6/1998 | Sanderford et al. |
| 5,828,332 A | | 10/1998 | Frederick |
| 6,025,800 A | | 2/2000 | Hager |
| 6,233,522 B1 | | 5/2001 | Morici |
| 6,255,982 B1 | * | 7/2001 | Hethuin ....................... 342/122 |
| 6,362,776 B1 | | 3/2002 | Hager et al. |
| 6,389,354 B1 | | 5/2002 | Hicks et al. |
| 6,585,733 B2 | | 7/2003 | Wellman |

OTHER PUBLICATIONS

"Strategy for ENVISAT radar altimetry cross–calibration and validation", Benveniste, J.; IGARSS 2000, vol.: 6, Jul. 24–28, 2000 pp. 2730–2732.*

* cited by examiner

Primary Examiner—John B. Sotomayor
(74) Attorney, Agent, or Firm—Matthew Luxton, Esq.; Armstrong Teasdale LLP

(57) ABSTRACT

A radar altimeter is described which includes a transmitter for transmitting a radar signal, a receiver for receiving the reflected radar signal, and at least one antenna coupled to one or both of the transmitter and receiver. The altimeter also includes a forward facing millimeter wave (MMW) antenna configured to move in a scanning motion and a frequency up/down converter coupled to the MMW antenna, the transmitter, and the receiver, and a radar signal processor. The converter up converts a frequency received from the transmitter to a MMW frequency for transmission through the MMW antenna, and down converts frequencies received to a radar frequency which are output to the receiver. The radar signal processor controls scanning motion of the MMW antenna, processes signals received at the antenna for a portion of the scanning motion, and processes signals received at the MMW antenna for other portions of the scanning motion.

26 Claims, 2 Drawing Sheets

RADAR ALTIMETER WITH FORWARD OBSTACLE AVOIDANCE CAPABILITIES

BACKGROUND OF THE INVENTION

This invention relates generally to radar altimeters, and more specifically to a radar altimeter with forward obstacle avoidance capabilities.

The proper navigation of an aircraft in all phases of its flight is based to a large extent upon the ability to determine the terrain over which it is passing, and further the ability to determine a position of the aircraft. In this regard, instrumentation, radar systems, and specifically, radar altimeters are used in combination with accurate electronic terrain maps. Radar altimeters, in conjunction with the electronic terrain maps, which provide the height and location of objects on the map, aid in the flight and the planning of a flight path for the aircraft.

Radar altimeters are commonly implemented within aircraft. A radar altimeter typically includes a transmitter for applying pulses of electromagnetic energy at regular intervals to an antenna which then radiates the energy, in the form of a transmit beam, towards the earth's surface. A transmit beam from a radar is sometimes said to "illuminate" an area (e.g. the ground) which reflects the transmit beam.

The radar altimeter further includes a signal receiver which receives the reflected pulses, sometimes referred to as return pulses, an echo, or as a return signal. Return pulses are received at a receive antenna, and constitute transmit beams that have been reflected from the earth's surface. It is known that some radar altimeters utilize a single antenna for both transmitting and receiving. A closed loop servo tracker for measuring the time interval between the transmitted pulse and its associated return pulse also forms a part of the radar altimeter. The time interval between the transmit pulse and the return pulse is directly related to the altitude of the aircraft above the highest object on the ground that is reflecting the transmit pulses.

However, when flying at very low altitudes certain terrain features in front of the aircraft, in the flight path, may not be detected. Known radar aircraft altimeters generally do not detect objects in front of an aircraft flight path. Examples include, for example, tall buildings, or the side of a cliff.

Therefore an aircraft equipped with a radar altimeter can determine an altitude, but the aircraft is generally not able to recognize objects in front of it unless it is also equipped with, for example, a costly scanning laser radar. In addition to being costly and relatively heavy, which is always an issue for air vehicles, such scanning laser radars are sometimes ineffective, for example, when encountering one or more of rain, snow, fog, dust, and smoke.

BRIEF SUMMARY OF THE INVENTION

In one aspect, a radar altimeter is provided that comprises a transmitter for transmitting a radar signal toward the ground, a receiver for receiving a reflected radar signal from the ground, and at least one altimeter antenna coupled to one or both of the transmitter and receiver. The radar altimeter also comprises a forward facing millimeter wave (MMW) antenna configured to move in a scanning motion, and a frequency up/down converter coupled to the MMW antenna, the transmitter, and the receiver. The converter up converts a frequency received from the transmitter to a MMW frequency and outputs the MMW frequency to the MMW antenna, and down converts a frequency received at the MMW antenna to a radar frequency, outputting the radar frequency to the receiver. The radar altimeter also comprises a radar signal processor coupled to the transmitter, to the receiver, and to the MMW antenna. The processor controls the scanning motion of transmissions from the MMW antenna, processes signals received at the altimeter antenna for a portion of the scanning motion, and processes signals received at the MMW antenna for other portions of the scanning motion.

In another aspect, a method of operating a radar altimeter to provide forward obstacle notifications is provided. The altimeter includes a forward facing millimeter wave (MMW) antenna, a frequency up/down converter coupled to processing circuits of the radar altimeter and MMW antenna, and altimeter transmit and receive antennas coupled to the processing circuits. The method comprises causing transmissions from the MMW antenna to move in a scanning motion, the scanning motion having horizontal portions and turnaround portions at ends of the horizontal portions, transmitting, receiving, and processing signals at the MMW antenna during the horizontal portions of the scanning motion, and transmitting, receiving, and processing signals at the altimeter transmit and receive antennas during the turnaround portions of the scanning motion.

In still another aspect, a radar altimeter comprising a forward obstacle warning unit is provided. The forward obstacle warning unit comprises a frequency up/down converter and a millimeter wave (MMW) antenna coupled to one another. The MMW antenna transmits signals received from the frequency up/down converter which originate at a transmitter of the radar altimeter. The frequency up/down converter receives signals from the MMW antenna, reduces the frequency, and passes the frequency reduced signals to a receiver of the radar altimeter.

In yet another aspect, a method for incorporating a forward obstacle warning feature into a radar altimeter is provided. The radar altimeter includes a forward obstacle warning unit including a circulator coupling a forward facing millimeter wave (MMW) antenna to a frequency up/down converter, the forward obstacle warning unit also coupled to a transmitter and receiver of the radar altimeter through respective transmit and receive switches. The transmitter and receiver are also coupled to at least one radar antenna through the transmit and receive switches for an altimeter function. The method comprises controlling a position of transmissions from the MMW antenna utilizing a processor of the radar altimeter, processing radar returns received at the MMW antenna to determine a range to a forward object, and processing radar returns received at the radar altimeter antenna to determine an altitude.

DETAILED DESCRIPTION OF THE INVENTION

A radar altimeter which provides a forward obstacle avoidance capability is herein described. In one embodiment, the radar altimeter provides a down looking altitude function, as is known in the art, based on a transmissions from and reflections received at a radar altimeter antenna. The altimeter also includes a forward terrain or obstacle warning function, based on transmissions from and reflections received at a forward facing millimeter wave (MMW) antenna. The radar altimeter provides the forward warning function without adding significant additional signal processing functions to the radar altimeter.

Figure 1:
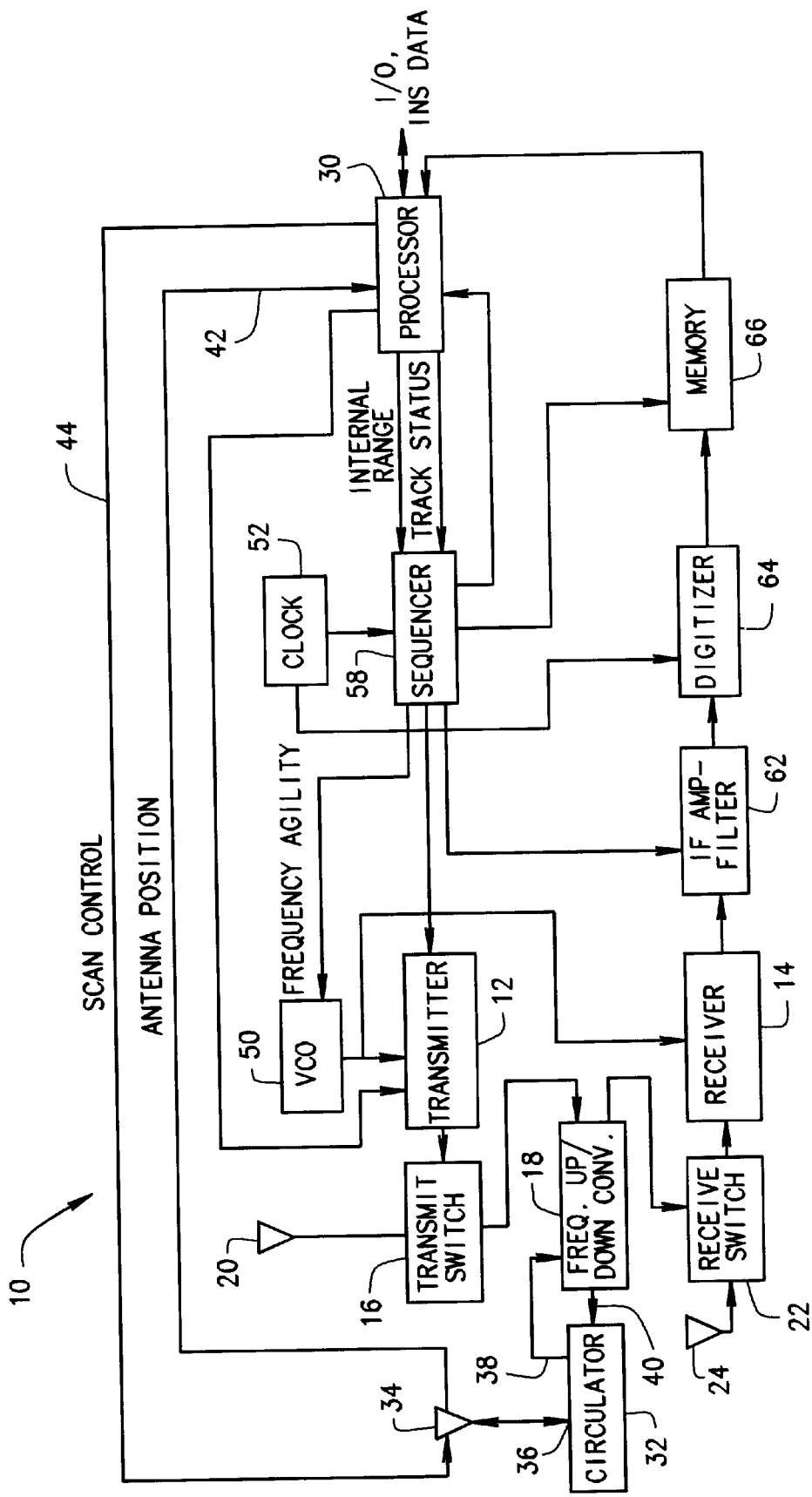
FIG. 1 is a block diagram of a radar altimeter incorporating a forward obstacle avoidance function.
Figure 2:
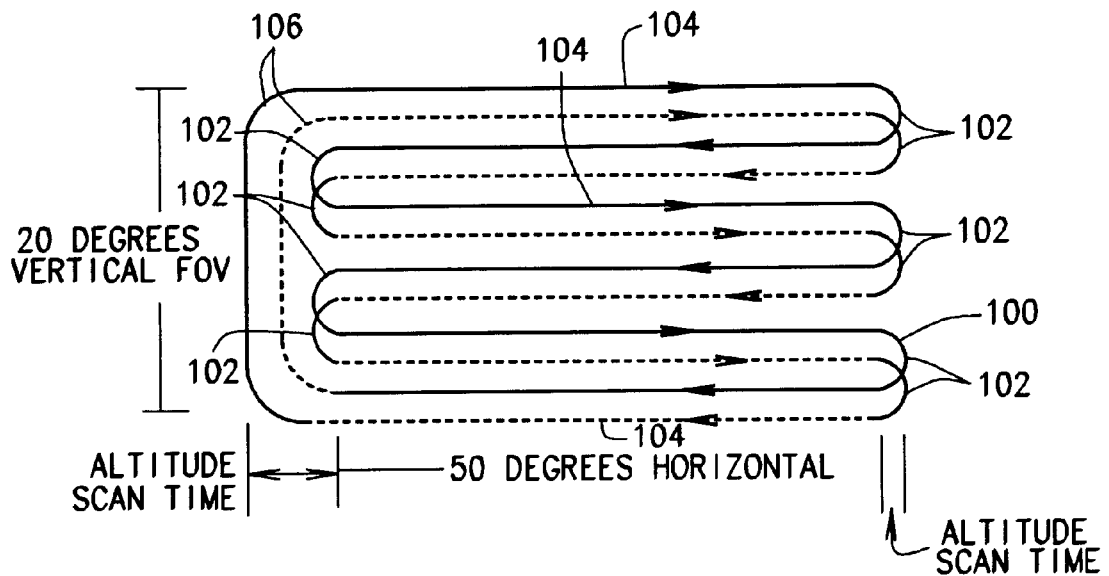
FIG. 2 is a depiction of an antenna scanning pattern for a forward obstacle avoidance function.

FIG. 1 is a block diagram illustrating one embodiment of a radar altimeter 10 which incorporates the above described forward obstacle avoidance capabilities. Radar altimeter 10 includes a transmitter 12 and a receiver 14. In one embodiment, an output of transmitter 12 is routed through a transmit switch 16 to one of a frequency up/down converter 18 or a transmit antenna 20, which transmits pulses towards the ground as part of an altimeter function. Receiver 14 receives its inputs from a receiver switch 22 which switches between frequency up/down converter 18 and a receive antenna 24 that receives radar pulses reflected from the ground that originated from transmit antenna 20 as another part of the radar altimeter function.

Transmitter 12 further receives pulse modulation and phase modulation data originating from radar processor 30. Receiver 14 forwards radar return data received at antenna 18 to radar processor 30. Radar processor 30 determines an altitude of the vehicle in which it is installed, and forwards the altitude data directly or indirectly to displays and other functions which utilize altitude data within an avionics system of an air vehicle.

As described above, radar altimeter 10 includes a frequency up/down converter 18 which is coupled to both transmitter 12 and receiver 14 through the respective transmit and receiver switches 16 and 22. Frequency up/down converter 18 is also coupled to a circulator 32 which is further coupled to a millimeter wave (MMW) antenna 34. Circulator 32 functions to circulate energy originating at its antenna port 36 to its receive port 38, and energy originating at its transmit port 40 to antenna port 36 allowing a single antenna to both transmit and receive. Frequency up/down converter 18 down converts received MMW frequency signals to an operating frequency of receiver 14 of radar altimeter 10, and also up converts transmit signals from transmitter 12 of radar altimeter 10 to a MMW frequency for transmission. Radar processor 30, typically through a data formatter (not shown), receives data from an inertial navigation system (INS) within the vehicle which provides data relating to, for example, vehicle attitude and velocity. Further, radar processor 30 receives an antenna position 42 from millimeter wave antenna 34 which is utilized as feedback in a closed loop scan control servo 44.

In operation, radar altimeter 10 combines the transmit, receive, and their associated signal processing functions of known radar altimeters with millimeter wave antenna 34 through circulator 32 and frequency up/down converter 18 to provide a forward obstacle avoidance function. In one embodiment, MMW antenna 34 and circulator 32 along with frequency up/down converter 18 provides, at least in part, a 20 degree by 50 degree field of view by having its transmit beam moved in a raster scanning motion (further described with respect to FIG. 3). The raster scanning motion is controlled via the antenna position functionality provided through radar processor 30 and switching between the forward obstacle avoidance function and radar altimeter function through transmit switch 16 and receiver switch 22. Further control of the forward obstacle avoidance function is provided by the scan control functionality also via radar processor 30.

Radar altimeter 10 further includes a voltage controlled oscillator (VCO) 50, a clock 52, sequencer 58, an intermediate frequency (IF) amplifier-filter 62, digitizer 64, and memory 66.

Transmitter 12 transmits pulses of RF energy, via transmit switch 16, towards the ground through antenna 20. The RF energy is modulated with a pulse compression Bi-phase coded format produced by sequencer 58 resulting in modulated radar signals. The output power of transmitter 12 is controlled in a closed loop fashion by processor 30. The output power of transmitter 12 is minimized by processor 30 for a low probability of detection.

Antenna 24 receives the modulated radar signals reflected from the ground. The received signals are routed through receiver switch 22, amplified and mixed down to an IF by receiver 14, and further amplified and band limited by IF amplifier-filter 62. Digitizer 64 digitizes the received signal, and outputs the digitized samples to memory 66.

Sequencer 58 selects ground return samples corresponding to a present altitude delay (as determined by processor 30) and communicated to sequencer 58 on an internal range line) and shifts the selected samples from memory 66 to processor 30. Processor 30 then determines if the next set of samples should be taken closer in or further out in range, and generates a new internal range command. The result is a closed-loop altitude tracking servo, such that as the altitude changes, processor 30 generates a measure of range tracking error which is used to change the internal range command fed back to sequencer 58. Processor 30 generates an output altitude from the internal range.

Frequency up/down converter 18 is coupled to transmitter 12 through transmit switch 16 and to receiver 14 through receiver switch 22. Operation of MMW antenna 34 is controlled through antenna positioning data 42 and scan control functions 44, for example, through couplings to processor 30. In one embodiment, frequency up/down converter 18 receives radar signals (RF energy) originating from transmitter 12 at about 4.3 GHz and up converts the energy to a millimeter wave frequency of about 35 GHz, to be transmitted by MMW antenna 34. Such transmissions by may reflected by an object and subsequently received by MMW antenna 34. Frequency up/down converter 18 takes the RF energy received at MMW antenna 34 at about 35 GHz and down converts to a radar signal at about 4.3 GHz, to be output to receiver 14. Circulator 32 functions to direct transmit signals from transmit port 40 of frequency up/down converter 18 to MMW antenna 34 and signals received by MMW antenna 34 to receive port 38 of frequency up/down converter 18.

In another embodiment of a radar altimeter (not shown) that incorporates a forward obstacle avoidance function, a circulator (not shown) is utilized so that a single antenna can be utilized for both the altimeter transmit and receive functions. In the embodiment, the circulator receives outputs from transmitter 12 (through transmitter switch 16) and provides that signal to the single antenna for a transmission of radar pulses. The circulator also receives the reflected pulse received at the single antenna, and directs those signal to receiver 12 (through receiver switch 22). Therefore, the circulator is coupled to both transmitter 12 and receiver 14 and further configured to alternate the single antenna between transmit and receive modes.

Figure 3:
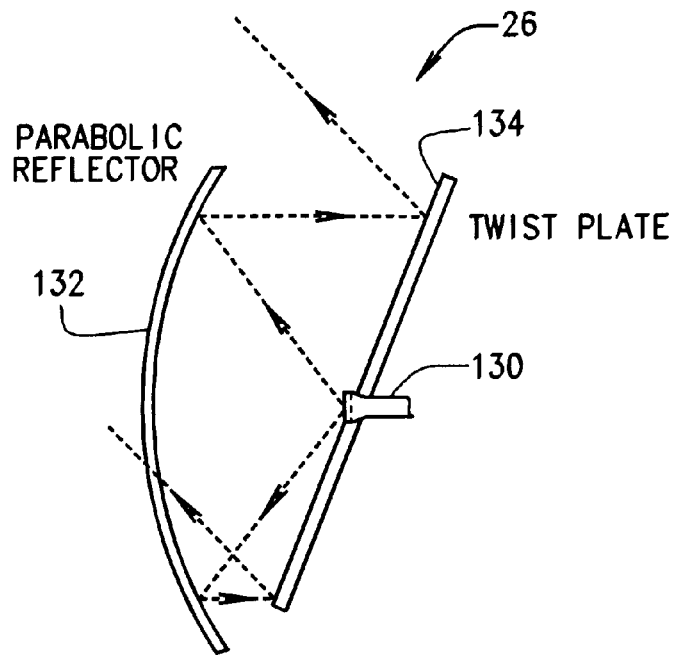
FIG. 3 illustrates one embodiment of an antenna assembly capable of providing the scanning pattern of FIG. 2.

FIG. 3 is an illustration of one possible embodiment of a scanning pattern for MMW antenna 34 (shown in FIG. 1). In the embodiment shown, MMW antenna 34 provides a 20 degree (in elevation) by 50 degree (in azimuth) field of view by moving its transmit beam 100 in a raster scanning motion. At ends 102 of the horizontal scans 104, and during a fly back portion 106 of the scan, collectively referred to as turnaround portion of the scan, the forward obstacle avoidance function within radar altimeter 10 is turned off, by radar processor 30, for example, and the altimeter function is activated. Once the altimeter function is completed, and MMW antenna 34 is again scanning horizontally, radar altimeter processing is halted, and the above described forward ranging function is again activated.

In one specific embodiment, scanning performance of frequency up/down converter 18, circulator 32, and MMW antenna 34, referred to collectively as a forward obstacle warning unit, includes an about 2.6 degree antenna beam width.

FIG. 4 illustrates one embodiment of MMW antenna 34 which provides the above described scanning motion. MMW antenna 34 includes a transmitting element 130, a parabolic reflector 132 to reflect signals from transmitting element 130, and a reflecting twist plate 134 which reflects signals reflected from parabolic reflector 132. Reflecting twist plate 134 is movable in two axis of rotation to cause the reflected signals to be reflected in the scanning motion above described. In one embodiment, reflecting twist plate 134 is movable such that signals 136 reflected from reflecting twist plate 134 provide an approximate 20 degree vertical and 50 degree horizontal field of view. Movement of reflecting twist plate 134 is controlled by one or both of sequencer 58 (shown in FIG. 1) and radar processor 30 (shown in FIG. 1) by providing the above described antenna positioning data and scan control functions.

Operation of the forward obstacle warning unit provides a forward obstacle avoidance function, at a reasonably low cost. Furthermore, a method of operating radar altimeter 10 is provided. The method includes moving transmissions from MMW antenna 34 in a scanning motion, the scanning motion having horizontal portions and turnaround portions at ends of the horizontal portions. The method further includes transmitting, receiving, and processing signals at MMW antenna 34 during the horizontal portions of the scanning motion. Signals are transmitted, received, and processed at altimeter transmit and receive antennas 20 and 24 respectively, during the turnaround portions of the scanning motion.

As described above, the methods include capabilities to move transmissions from MMW antenna 34 in a raster scanning motion, where the turnaround portion of the raster scan provides a vertical component to the scanning motion. In operation, a signal is received from the radar transmitter at frequency up/down converter 18 where the signal is up converted to a MMW frequency and subsequently output to MMW antenna 34 for transmission. After reflecting off an object, the transmitted, MMW signals are received at MMW antenna 34, forwarded to the frequency up/down converter 18 where they are down converted to a radar frequency signal. The radar frequency signal is then provided to the radar receiver. Operation of the above described forward obstacle warning unit, at a millimeter wave frequency, within a radar altimeter, allows for performance in all weather conditions and is relatively inexpensive to implement within a radar altimeter.

The method is also applicable to a radar altimeter where a single antenna is switched between transmit and receive modes via a circulator to provide the altimeter function, although such an altimeter is limited to specific operating conditions. A single radar antenna time sharing transmit and receive functions via a circulator or other transmit/receive switch can be used if the desired minimum radar range capability is somewhat greater than zero, and is directly dependent on a transmit pulse width. For example, a pulse width of 40 nanoseconds (which corresponds to the time it takes a radar transmission to travel about 20 feet) limits the altimeter range to about 20 feet (20 feet each for transmission and reflection) when a signal settling time is considered. However, aircraft, especially helicopters, utilize altimeter functionality to zero feet, and therefore separate transmit and receive antennas are utilized for the altitude function.

A forward obstacle function for flight cannot be utilized to a range of zero feet, for obvious reasons. For a helicopter application, a range of about 30 feet is the minimum usable forward obstacle warning range. Therefore a single antenna with a circulator can be utilized, as described above, to provide the forward obstacle warning and to save on costs and weight.

While the invention has been described in terms of various specific embodiments, those skilled in the art will recognize that the invention can be practiced with modification within the spirit and scope of the claims.

What is claimed is:

1. A radar altimeter comprising:
   a transmitter for transmitting a radar signal toward the ground;
   a receiver for receiving a reflected radar signal from the ground;
   at least one altimeter antenna coupled to at least one of said transmitter and said receiver;
   a forward facing millimeter wave (MMW) antenna configured to provide transmissions that move in a scanning motion;
   a frequency up/down converter coupled to said MMW antenna, to said transmitter, and to said receiver, said converter up converting a frequency received from said transmitter to a MMW frequency and outputting the MMW frequency to said MMW antenna, said converter down converting a frequency received at said MMW antenna to a radar frequency and outputting the radar frequency to said receiver; and a radar signal processor coupled to said transmitter, to said receiver, and to said MMW antenna, said processor controlling the scanning motion of transmissions from said MMW antenna, processing signals received at said altimeter antenna for a portion of the scanning motion for an altimeter function, and processing signals received at said MMW antenna for other portions of the scanning motion, to provide a forward obstacle warning function.

2. A radar altimeter according to claim 1 wherein the scanning motion of transmissions from said MMW antenna is a raster scanning motion, the raster scanning motion comprising turnaround portions.

3. A radar altimeter according to claim 2 wherein signals received at said altimeter antenna are processed during turnaround portions of the raster scanning motion of transmissions from said MMW antenna.

4. A radar altimeter according to claim 2 wherein during turnaround portions of the raster scanning motion of transmissions from said MMW antenna, signals are transmitted from said altimeter antenna.

5. A radar altimeter according to claim 1 wherein the scanning motion of said MMW antenna comprises an approximate 20 degree vertical and 50 degree horizontal field of view.

6. A radar altimeter according to claim 1 wherein to provide the scanning motion, said MMW antenna comprises a transmitting element, a parabolic reflector to reflect signals from said transmitting element, and a reflecting twist plate, said plate reflecting signals reflected from said parabolic reflector and movable to cause the reflected signals to be reflected in a scanning motion.

7. A radar altimeter according to claim 1 wherein said frequency up/down converter converts signals received from said transmitter to about 35 GHz.

8. A radar altimeter according to claim 1 comprising a circulator which couples said MMW antenna to said frequency up/down converter.

9. A radar altimeter according to claim 1 further comprising:

a transmit switch alternately coupling said transmitter to one of said altimeter antenna and said frequency up/down converter; and a receiver switch alternately coupling said receiver to one of said altimeter antenna and said frequency up/down converter.

10. A method of operating a radar altimeter to provide forward obstacle notifications, the altimeter including a forward facing millimeter wave (MMW) antenna, a frequency up/down converter coupled to processing circuits of the radar altimeter and the MMW antenna, and altimeter transmit and receive antennas coupled to the processing circuits, said method comprising:

causing transmissions from the MMW antenna to move in a scanning motion, the scanning motion having horizontal portions and turnaround portions at ends of the horizontal portions;

transmitting, receiving, and processing signals at the MMW antenna during the horizontal portions of the scanning motion to provide warning of forward obstacles; and transmitting, receiving, and processing signals at the altimeter transmit and receive antennas during the turnaround portions of the scanning motion to provide an altimeter function.

11. A method according to claim 10 wherein moving the MMW antenna in a scanning motion comprises moving the MMW antenna in a raster scanning motion, the turnaround portion providing a vertical component to the scanning motion.

12. A method according to claim 10 wherein moving the MMW antenna in a scanning motion comprises moving the MMW antenna in a raster scanning motion having a 20 degree vertical and 50 degree horizontal field of view.

13. A method according to claim 10 wherein the radar altimeter includes a transmitter and wherein transmitting, receiving, and processing signals at the MMW antenna comprises:

receiving a signal from the transmitter at the frequency up/down converter;

up converting the received signal to a MMW frequency signal; and outputting the MMW frequency signal to the MMW antenna.

14. A method according to claim 13 wherein the radar altimeter includes a circulator coupling the frequency up/down converter to the MMW antenna, and wherein outputting the MMW frequency signal to the MMW antenna comprises:

receiving the MMW frequency signal at the circulator; and passing the MMW frequency signal to the MMW antenna.

15. A method according to claim 10 wherein the radar altimeter includes a receiver and wherein transmitting, receiving, and processing signals at the MMW antenna comprises:

receiving a MMW frequency signal at the MMW antenna;

forwarding the received MMW frequency signal to the frequency up/down converter;

down converting the MMW frequency signal to a radar frequency signal; and outputting the radar frequency signal to the receiver.

16. A method according to claim 15 wherein the radar altimeter includes a circulator coupling the frequency up/down converter to the MMW antenna, and wherein forwarding the received MMW frequency signal to the frequency up/down converter comprises:

receiving the MMW frequency signal at the circulator; and passing the MMW frequency signal to the frequency up/down converter.

17. A method according to claim 10 wherein the altimeter further includes a reflecting parabolic reflector and a reflecting twist plate, and wherein transmitting, receiving, and processing signals at the MMW antenna comprises:

transmitting a signal from the MMW antenna towards the parabolic reflector;

reflecting the signal from the parabolic reflector towards the reflecting twist plate; and moving the reflecting twist plate to cause the signals to be reflected in a scanning pattern.

18. A radar altimeter comprising a forward obstacle warning unit, said unit comprising:

a frequency up/down converter; and a millimeter wave (MMW) antenna coupled to said converter, said MMW antenna configured to transmit signals received from said frequency up/down converter, said frequency up/down converter configured to receive signals from a transmitter of said radar altimeter, said MMW antenna further configured to pass signals received to said frequency up/down converter, said frequency up/down converter further configured to output signals to a receiver of said radar altimeter.

19. A radar altimeter according to claim 18 wherein said unit comprises a circulator which couples said frequency up/down converter to said MMW antenna.

20. A radar altimeter according to claim 18 wherein said unit comprises:

a transmit switch configured to switch an output of an altimeter transmitter between an altimeter transmit antenna and said frequency up/down converter; and a receive switch configured to switch an input to an altimeter receiver between an altimeter receive antenna and said frequency up/down converter.

21. A radar altimeter according to claim 18 wherein said forward obstacle warning unit further comprises a reflecting twist plate, said twist plate moving to reflect signals transmitted from said MMW antenna in a raster scanning pattern.

22. A radar altimeter according to claim 21 wherein said forward obstacle warning unit is configured to be inactive during vertical portions of the raster scanning pattern and active during horizontal portions of the raster scanning pattern.

23. A method for incorporating a forward obstacle warning feature into a radar altimeter which includes a forward obstacle warning unit including a circulator coupling a forward facing millimeter wave (MMW) antenna to a frequency up/down converter, the forward obstacle warning unit coupled to a transmitter and receiver of the radar altimeter through respective transmit and receive switches, the transmitter and receiver also being coupled to at least one radar antenna through the transmit and receive switches for an altimeter function, said method comprising:

controlling a position of transmissions from the MMW antenna utilizing a processor of the radar altimeter;

processing radar returns received at the MMW antenna to determine a range to a forward object; and processing radar returns received at the at least one radar antenna to determine an altitude.

24. A method according to claim 23 wherein controlling a position of the MMW antenna comprises programming the processor to cause transmissions from the MMW antenna to move in a raster scanning motion.

25. A method according to claim 24 wherein processing radar returns received at the MMW antenna comprises processing returns received at the MMW antenna during horizontal portions of the raster scanning motion.

26. A method according to claim 24 wherein processing radar returns received at the radar antenna comprises processing returns received at the radar antenna during turn-around portions of the raster scanning motion of the MMW antenna.

* * * * *